(12) United States Patent
Diederiks et al.

(10) Patent No.: US 6,778,191 B2
(45) Date of Patent: Aug. 17, 2004

(54) METHOD OF INTERACTING WITH A CONSUMER ELECTRONICS SYSTEM

(75) Inventors: Elmo Marcus Attila Diederiks, Eindhoven (NL); Bartel Marinus Van De Sluis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 458 days.

(21) Appl. No.: 09/801,066

(22) Filed: Mar. 7, 2001

(65) Prior Publication Data

US 2001/0056364 A1 Dec. 27, 2001

(30) Foreign Application Priority Data

Mar. 9, 2000 (EP) ........................................... 00200858

(51) Int. Cl.⁷ ............................................... G09G 5/00
(52) U.S. Cl. ..................................... 345/706; 700/245
(58) Field of Search ............................... 345/440, 706, 345/709, 619, 621, 473, 700, 716, 727, 728, 866; 700/245, 250, 283, 264

(56) References Cited

U.S. PATENT DOCUMENTS

| 5,367,454 A | * | 11/1994 | Kawamoto et al. ......... 345/706 |
| 5,809,449 A | * | 9/1998 | Harper ........................ 702/63 |
| 6,018,711 A | | 1/2000 | French-St. George et al. ... 704/275 |
| 6,175,772 B1 | * | 1/2001 | Kamiya et al. ............... 700/31 |
| 6,340,977 B1 | * | 1/2002 | Lui et al. .................... 345/709 |
| 6,490,370 B1 | * | 12/2002 | Krasinski et al. ........... 382/195 |

FOREIGN PATENT DOCUMENTS

| EP | 0626635 A2 | 11/1994 | ............. G06F/3/00 |
| EP | 0893308 A2 | 1/1999 | ........... B60R/16/02 |

OTHER PUBLICATIONS

"ActiveX™ Technology for Interactive Software Agents", Designing Characters for Microsoft Agent, Microsoft Corp., 1997.

* cited by examiner

Primary Examiner—Ba Huynh
Assistant Examiner—Ting Zhou
(74) Attorney, Agent, or Firm—Edward W. Goodman

(57) ABSTRACT

The behavior of a consumer electronics system is modeled by a plurality of dynamically changing system elements, such as, system states or variables. Preferably, the system is voice controlled. Instead of representing all system elements, like times-span and whether or not a command has been recognized, individually to the user, one appearance is chosen which represents actual values of a plurality of the system elements. The appearance is chosen from a plurality of different visual and/or auditive appearances of one object. Preferably, the object is an anthropomorphic character. The chosen appearance is presented to the user.

10 Claims, 4 Drawing Sheets

METHOD OF INTERACTING WITH A CONSUMER ELECTRONICS SYSTEM

BACKGROUND OF THE INVENTION

1. Field of the Invention

The invention relates to a method of enabling a user to interact with a consumer electronics system, the behavior of the system being modeled by a plurality of dynamically changing system elements, such as, system states or variables.

The invention also relates to a consumer electronics system, the behavior of the system being modeled by a plurality of dynamically changing system elements, such as, system states or variables.

2. Description of the Related Art

Consumer electronics products are getting increasingly complex. This makes the interaction of a user with the products/systems more difficult. Nowadays, much of the functionality of the product is implemented in software and, as such, the behavior of the system is, to a high degree, not directly visible to the user. In many situations, it is required that the user be informed about the behavior of the system in order to adequately interact with the system. It is, therefore, desired that certain system elements, representing, for instance, states and variables of the system, are represented to the user. In particular, for voice-controlled systems, it is desired that, in addition to the system elements relating to the normal behavior of the system, also some of the elements of the voice control/speech recognition are represented. This results in even more elements needing to be represented to the user. Conventionally, different system elements are each represented using a different user interface element, such as, different display windows, or using different textual or graphical objects in a window. In this way, many user interface elements may be presented simultaneously, or may be accessible via hierarchically arranged menus. The large amount of information presented to the user makes it difficult for the user to quickly assess the total behavior of the system. It also requires a large display area or, if hierarchical menus are used, provides a less direct access to information.

The Microsoft ActiveX technology for interactive agents discloses that an agent, such as an anthropomorphic character, can represent a system event. A PC application program can send an event to the ActiveX layer. This layer executes an animation corresponding to the event. In this system, a strict one-to-one coupling exists between an event and an animation. If several events need to represented to the user at the same time, several animations in parallel need to be invoked. As described before, this makes it difficult for the user to quickly assess the overall behavior of the system. Moreover, a lot of system resources are required.

In user controlled systems, it is generally desired to give feedback to the user on issued commands. It is also desired that such feedback is intuitive so that it can easily be interpreted by the user and does not require any learning. The feedback should be given in such a way that people can easily understand and predict the system behavior. However, in voice-controlled systems, various types of feedback must be presented, often at the same time. These types of feedback are, among others, the time-span (i.e., the period the voice control unit is trying to recognize and interpret voice input), the time-span left, whether the user is heard, whether the user is understood, whether the user spoke a valid command, whether the user used a sensible command, which user is recognized (multi-user situation), whether the system is going to execute the command, and whether the system is busy. The conventional approach of presenting all of this information to the user can easily overwhelm the user and result in an ineffective interaction between the user and the system.

SUMMARY OF THE INVENTION

It is an object of the invention to provide an improved method of interaction between a user and a consumer electronics system. It is a further object to provide a consumer electronics system with an improved interaction with the user.

This object is achieved in a method of enabling a user to interact with a consumer electronics system, where the behavior of the system is modeled by a plurality of dynamically changing system elements, such as system states or variables, by presenting the plurality of system elements to the user, the method including the steps:

choosing one appearance from a plurality of different visual and/or auditive appearances of one object in dependence on actual values of the plurality of system elements; and presenting the chosen appearance to the user.

By using only one object to represent several system elements, the user can assess the overall behavior/state of the system by focussing on only one object. Moreover, the loading on resources, such as, display area, processing power, memory, etc., is kept low.

In a particular embodiment of the invention, the object is preferably an anthropomorphic character having the ability to express many elements. Particularly, for a system which allows speech input, the power to express independent system elements at the same time is very beneficial.

Voice control as an interaction modality for (consumer) products is getting more mature. However, people perceive it as strange, uncomfortable or even unacceptable to talk to a product, e.g., a television. To avoid that conversations or utterances not intended for controlling the products are recognized and executed, most voice controlled systems require the user to activate the system (resulting in a time span during which the system is activated). Such an activation may be performed via voice, for instance by the user speaking a keyword, e.g., 'TV'. By using an anthropomorphic character, it is more natural to address the character (instead of the product), e.g., by saying 'Bello' to a dog-like character. This removes a barrier in the interaction. Moreover, such a system can make effective use of one object with several appearances, chosen as a result of several state elements. For instance, a basic appearance (e.g., a sleeping animal) can be used when the system is not yet active. A second group of appearances can be used when the system is active (e.g., awake appearances of the animal). The progress of the time span can then, for instance, be expressed, by the angle of the ears (fully raised at the beginning of the time span, fully down at the end). The same group of appearances can also express whether or not an utterance was understood (an 'understanding look' versus a 'puzzled look'). Also audible feedback can be included, for example, a 'glad' bark if a word has been recognized. A user can quickly grasp the feedback on all such system elements by looking at the one appearance which represents all these elements (e.g., raised ears and an understanding look, or lowered ears and a puzzled look).

In general, recognition errors still occur in voice-controlled systems, e.g., nothing is recognized even though the user did speak a command, or something different is recognized. Users perceive such interaction difficulties as quite unacceptable, after all, it is a product and shouldn't fail. By using an anthropomorphic character, the user will automatically associate the level of quality to be expected during the interaction with the kind of character chosen for the interaction. By choosing a character like a dog, the user will much more easily accept that some commands are not understood. It is quite normal that a command needs to be given several times to a dog or needs to be rephrased.

The system can already have stored therein a set of appearances derived from the basic object. Any suitable form for selecting an appearance from the set may be used. For instance, tables may be used to map N-system elements to one value that specifies one of the appearances in the set. Alternatively, a weighting mechanism may be used, where, for instance, a formula with the N system elements as input parameters produces one descriptor for an appearance. Advantageously, a fuzzy logic algorithm may be used.

Whenever one of the system elements to be represented changes, a new appearance (representing all elements) is generated. Such a generation may start from a basic appearance. Preferably, the currently presented appearance is modified. In general only one system element changes at a time. A system element preferably relates to one distinct aspect of the object. For instance, the remaining time span in a voice-controlled system is expressed via the angle of the ears of an animal. A change of value of that one element results that only the corresponding aspect is changed. This can be done by selecting a new appearance from a set of appearances. By using suitable graphical engines, it is also possible to modify only that one aspect of the currently presented appearance. For instance, a 'neutral' mouth (substantially horizontal) can be changed to a glad expression (curled mouth corners) when the system has recognized a voice command. By only locally changing that one aspect, other aspects of the object, reflecting other system elements, can stay the same, if so desired. For instance, as long as the volume of the speech is relatively low (but still high enough to recognize a word), in all presented appearances the character could hold his hand near his ear, while the mouth can be changed to reflect whether or not a command has been recognized, and the ear angle could reflect the remaining time span.

The modification of the object can relate to all kinds of aspects. It may relate to the size or shape of the appearance, as well as to graphical attributes of the appearance, such as, brightness, color, or opacity. With state-of-the-art graphics engines, also the expression, such as, the facial or body expression, of an appearance can be changed. In addition to or instead of changing visual aspects of the object, also audible aspects can be changed, such as, volume of audible output or the prosody (e.g., a rising pitch if an unexpected command has not been recognized).

Advantageously, the appearance is animated. This makes it easier to draw the attention of the user to an important system element reflected at that time by the appearance. It is preferred that the animation is synchronous to change of the variable. For instance, the drop in ears is synchronized to the progress of the time span. In a situation where the changes in system elements are shown real-time by modifying the appearance, it is preferred that the engine performing the modification is informed of each change of the variable.

BRIEF DESCRIPTION OF THE DRAWINGS

These and other aspects of the invention will be apparent from and elucidated with reference to the embodiments shown in the drawings, in which.

DESCRIPTION OF THE PREFERRED EMBODIMENTS

Figure 1:
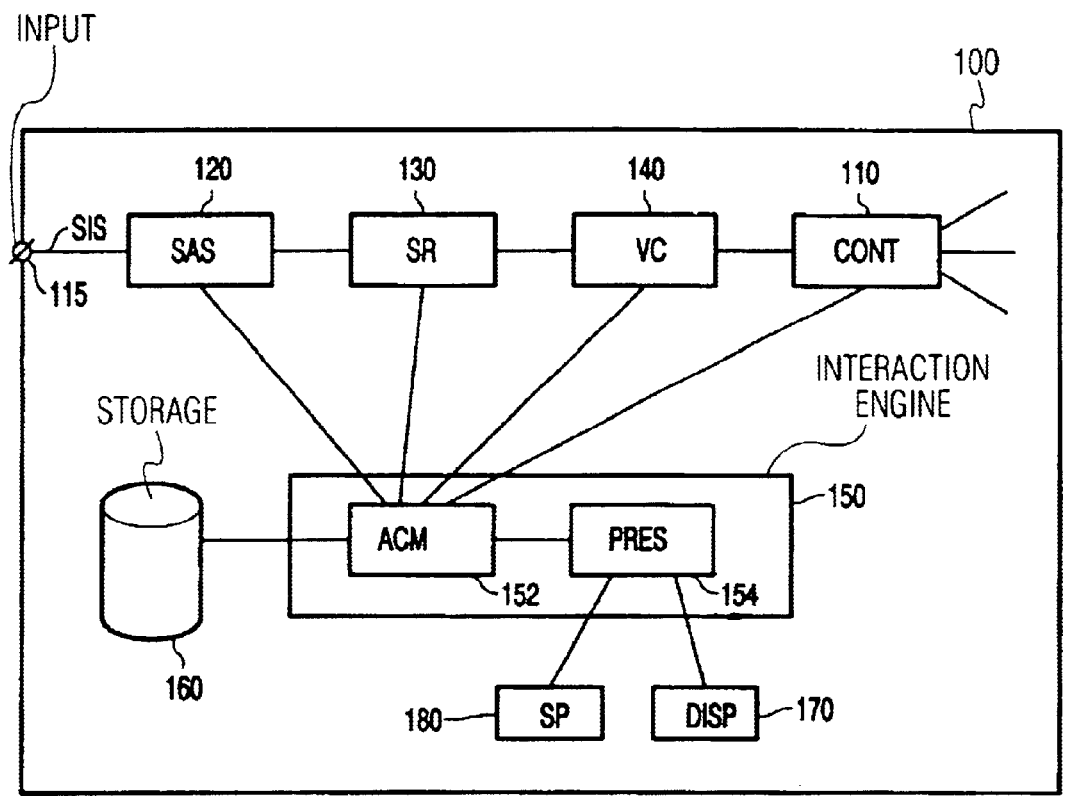
FIG. 1 shows a block diagram of the system according to the invention.

FIG. 1 shows a consumer electronics system 100. The system is described in detail for a voice-controlled consumer electronics system. It will be appreciated that the presentations technique according to the invention can also be used for a conventionally controlled system, e.g., with input via a remote control. The system 100 includes a controller 110 which represents the control over the conventional functionality of the product, e.g., a TV, DVD player, set-top box, etc. Since this functionality as such is not the subject of the invention, no further details are given of the consumer electronics product itself. It will be appreciated that the interaction can be limited to the interaction with only one isolated device. With the emergence of full digital networks, increasingly, the difference between a device and a system will disappear. The interaction according to the invention may be applied to isolated devices as well as systems. The term system is, therefore, intended to cover both situations.

The system includes an input 115 for receiving a speech signal (SIS). The input may be received via a microphone. A speech analysis subsystem (SAS) 120 analyses the signal in order to prepare it for recognition by a speech recognizer 130. The speech analysis is well-know and may include, for instance, A/D conversion, segmenting of the speech signal into (usually overlapping) frames, and representing the frames as vectors (usually based on an LPC spectral analysis). The analysis may also include detecting of whether or not a speech signal is present (e.g., based on an energy or more advanced measures). The speech recognizer 130 tries to recognize the output of the speech analysis subsystem 120 by, in a well-known manner, comparing it to reference models, such as, an acoustic model. The output represents one or more recognized words. This is fed into a voice control unit 140, which converts the recognized words into internal system operations. These operations are passed on to the controller 110. It should be noted that increasingly functions are integrated in hardware. As such, as an alternative to using separate modules (implemented in dedicated hardware or, in whole or partly, implemented with dedicated micro-controllers), one large controller may be used to perform several tasks, e.g., the speech recognition, the voice control and the system control.

According to the invention, the system also includes an interaction engine 150. The controller 110 supplies information on several system elements to the interaction engine 150. These elements may represent the normal system states or system variables to be presented by the interaction engine 150. In a voice-controlled system, preferably the interaction engine 150 also receives input from the respective speech-related parts. For instance, the speech analysis subsystem 120 could indicate whether or not speech is being received (controlling the time span indication) and whether or not the volume is sufficient. The speech recognizer 130 can indicate whether a command of the total set of available commands has been recognized and whether or not the recognized command is part of a currently valid subset (usually, not all commands can be instituted at all times, e.g., if no cassette is present in a VCR, the play command may not be in the valid set of the recognizer). The voice control unit 140 may indicate whether or not a recognized command could be translated into internal operations, in view of the current state of the system. In a preferred embodiment, at least the voice control unit 140 is part of the interaction engine 150. In this way, the interaction engine also controls the input side of the interaction, shielding the main controller 110 from interaction details. The interaction can then also be made more powerful without putting too much burden on the controller 110. The interaction engine 150 can fully control the interaction and decide when an instruction should be given to the controller 110. This opens the possibility for full and free dialogues between the user and the interaction layer, without the user having to be afraid that the system unintentionally will execute a command. For instance, the user can, in such a dialogue, use a word like 'stop' without having to worry that that will always stop the VCR from playing. The interaction layer will decide whether the user wanted to stop the VCR from playing, or actually wanted to cancel (part of) the dialogue with the user.

According to the invention, the interaction engine 150 includes an appearance choosing module 152. This module chooses, for the various actual values of the supplied N (N>1) system elements, one appearance to be presented to the user. As described earlier, such a choosing may be performed in any suitable way, including using mapping tables, projection formulas and fuzzy logic. In a preferred embodiment, the system includes a storage 160 for storing a set of appearances of the same object. In such a system, the appearance choosing module 152 ensures that the correct appearance is retrieved from the storage 160. As an alternative, the system may also include a further engine (not shown) for transforming (at least part of) the appearance. In such a system, the appearance choosing module 152 determines the appropriate parameters for such a further engine. In this way, the appearance choosing module 152 effectively still chooses the appearance to be presented. It is also possible to combine both approaches. For instance, the appearance choosing module 152 may select an appearance from a basic set of appearances (e.g., based on only one or a few system elements) and modify the chosen appearance to fine tune it to the entire set of actual system element values to be presented.

The interaction engine 150 also includes a presentation module 154 for presenting the chosen appearance to the user. The presentation may be visual, e.g., via a display 170 and/or audible, e.g., via a loudspeaker 180.

In the system according to the invention, advantageously, an object is used which can express many different system elements and which the user can assess quickly. Preferably, an anthropomorphic character is used. As described, the object has a wide range of expressions such that it can express several, not directly related, elements of a (voice control) system at the same time. In this way, the object becomes a central target for the voice control interaction. The elements to be represented can include (but are not limited to) different states and variables of the recognizer/voice control unit. Examples of such parameters are:

Listening
Time-span, Time-span left
Confidence level
Possible commands
Something heard, but not recognized Command recognized, will be executed, is executed
Command recognized, but not valid In a preferred embodiment, the interaction engine 150 adds functionality to the system. Instead of only mapping system events to an appearance and presenting the appearance, the interaction engine 150 is operative to actively attract the attention of the user (enforcing the focus point of the interaction). As an example, the interaction engine itself can decide that it is desired that the user interacts with the system. For instance, an interaction may not have been completed yet, or the system is in a state in which the system usually does not stay for a long time (e.g., the same Teletext page has been displayed for several minutes). Advantageously, the interaction engine 150 is operative to 'spontaneously', independent of the system elements, attract the attention of the user. For instance, a random generator may be used to trigger drawing the attention of user, on average, once an hour. This reinforces that the appearance is a living object and, as such, lowers the threshold in interaction. Since not all users will appreciate autonomous behavior, the user can preferably disable such behavior. Drawing the attention of the user is preferably performed by using an animation.

The interaction engine 150 is also operative to actively participate in the interaction, by actively communicating the system state(s) in contrast with the prior art voice control interaction systems, where the system controllers fully controls the interaction and a passive representation layer is used. For example, the interaction engine 150 can present a confirming look, to communicate to the user that the command is recognized by the voice control unit and will be executed. No instructions from the controller are required.

Preferably, the interaction engine 150 is also operative to actively engage the user further in the interaction. For example, the module can present a puzzled, questioning look, thus asking for further explanation or elucidation from the user, when a command is not completely clear in itself, or when the confidence level of the recognized command (a variable from the recognizer) is somewhat low. Another example is that the user has the possibility to interfere when a (part of a) command is wrongly recognized or when the user changes his/her mind. The user might say 'Hide . . . ', and then change his/her mind. The interaction engine 150 is such that the user is engaged to interfere by saying 'No', resulting in the system listening for a completely new command instead of listening for what has to be hidden. The user now says 'Start . . . web-browser' and the representation shows a confirming look, to communicate to the user that the command is recognized and will be executed.

Anthropomorphic Character

As described above, using an anthropomorphic character is an effective way of interaction with system, in particular, voice controlled systems. This anthropomorphic character is the entity with which the user talks. The anthropomorphic character takes care of effecting what the user is telling it to do. The anthropomorphic character can be realized as an audio-visual, or audio or visual only. Thus, instead of calling, for example, the TV ('Television . . . '), the user can call the anthropomorphic character by its name, for example, 'Bello . . . '. This also opens a way from the traditional form of voice control based on isolated commands to a more natural language-oriented control. For example, instead of instructing a television to switch to channel X by saying 'Television, channel X', the user can tell the anthropomorphic character what he wants, like 'Bello, switch to channel X'.

A further advantage is that an anthropomorphic character is more human-like than the product itself. Most humans or animals do not respond to 100% of the commands they are given, and furthermore, they like particular people more than others. In practice, speech recognition systems and voice control systems understand some people much better than others. Using a character to represent such a system behavior makes the behavior of the system more acceptable. If an anthropomorphic character does not respond to a certain command, the user might accept it and be willing to repeat the command.

In general, an anthropomorphic character can express more clearly what is going on, for instance, by using anthropomorphic expressions (facial and/or bodily expressions) to show whether it understands the words, that it will execute and put into effect the users commands, or that it did not understand what the user said.

Sample Anthropomorphic Character

Figure 2:
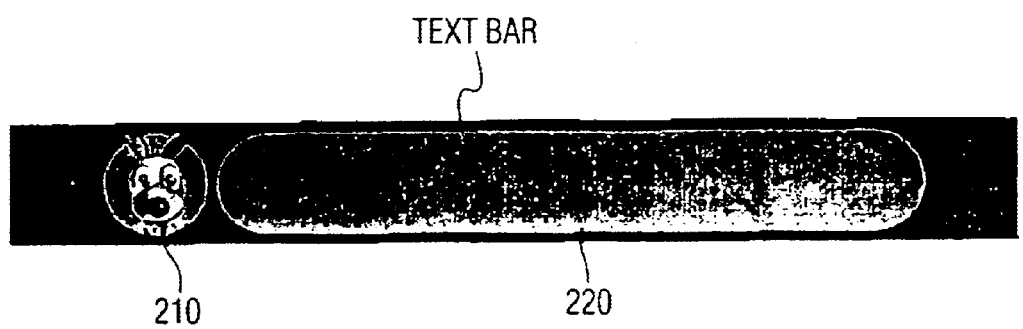
FIG. 2 shows the 'multi-expressive' object 210.

A possible implementation is an anthropomorphic character in the form of a little dog living in a television, as illustrated in FIG. 2. The dog 210 is a 3D animated on-screen character, also using sounds. Several states are defined that can be derived from the speech recognizer 130. For each state, an animation and non-speech audio cues (dog sounds) are designed which provide appropriate feedback on the spoken command. The dog 210 is accompanied by an on-screen text bar 220 that displays in text the commands as recognized by the system. If a user says "Bello", the dog appears on the screen. "Switch to channel X" results in Bello affirmatively barking two times while the TV is switched to the channel X. Furthermore, if a command is not understood, Bello starts looking puzzled and makes a sound that can be interpreted as "what do you mean?". After an eight-second period without voice commands being detected, Bello slowly falls asleep, after which it is removed from the screen.

Figure 3A:
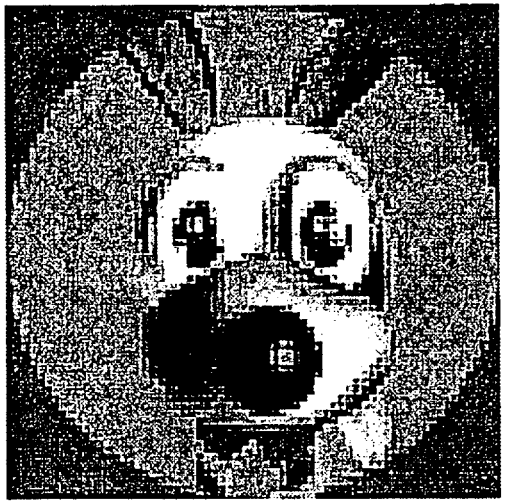
FIGS. 3A–3D illustrate several appearances of the object.
Figure 3C:
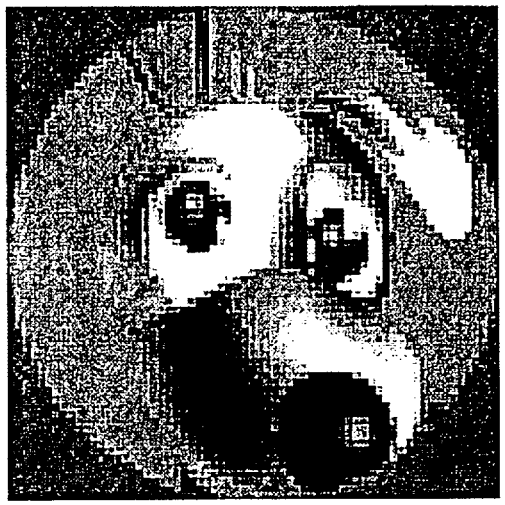
Figure 3B:
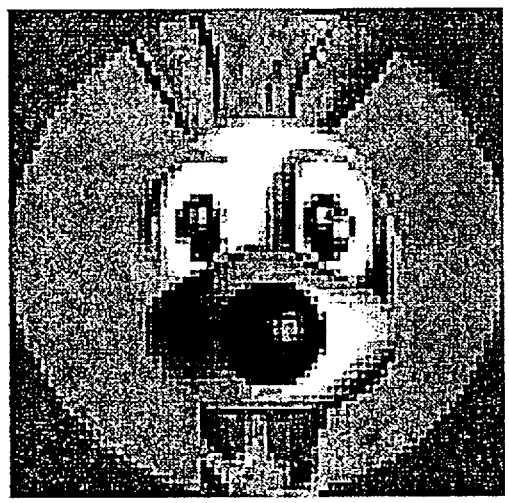
Figure 3D:
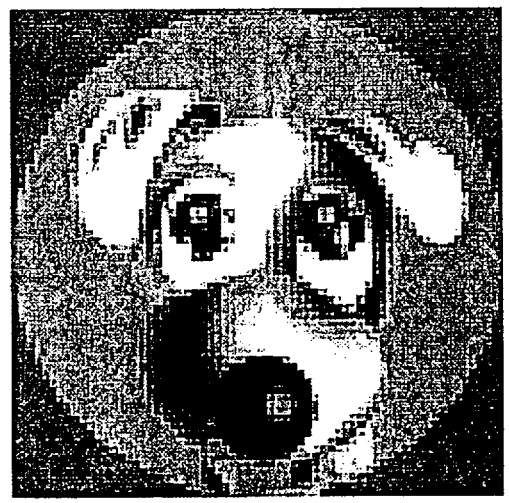

FIGS. 3A–3D illustrate four basic appearances of Bello. In FIG. 3A, Bello has just been called and is waiting for a command. In FIG. 3B, a command has been recognized and Bello is barking affirmatively. In FIG. 3C, speech has been received but no command has been recognized. Bello does not understand. In FIG. 3D, the user stops the interaction. Bello is being sent away ('Bello, down').

Figure 4:
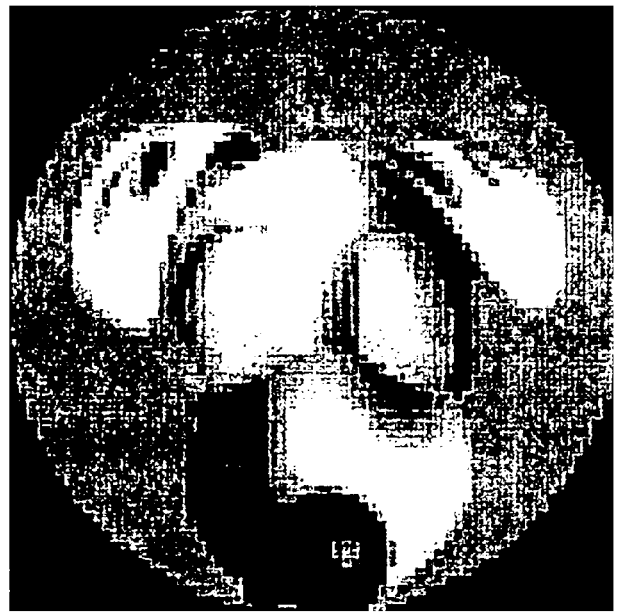
FIG. 4 illustrates an expression, which can be combined with other appearances.

FIG. 4 illustrates the end appearance of Bello after the time span has expired. This appearance can easily be combined with appearances reflecting other system elements. For instance, starting from the appearance of FIG. 3A, a slow transition to the appearance of FIG. 4 can occur if no input is received. A similar transition can occur from the appearance of FIG. 3C to the appearance of FIG. 4.

Figure 5A:
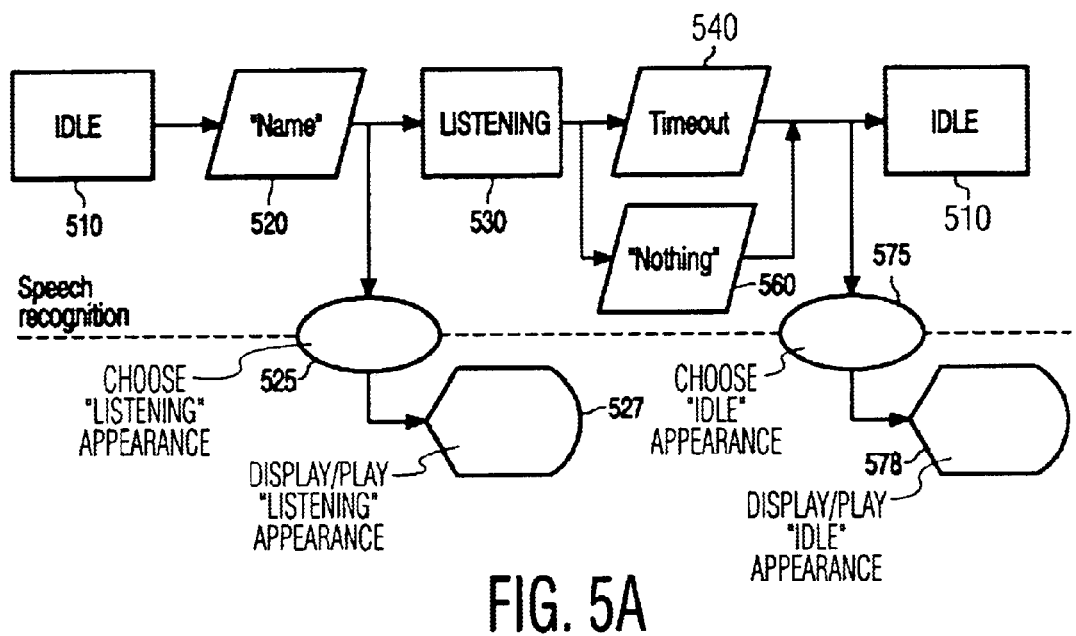
FIGS. 5A and 5B show a state diagram of the system.
Figure 5B:
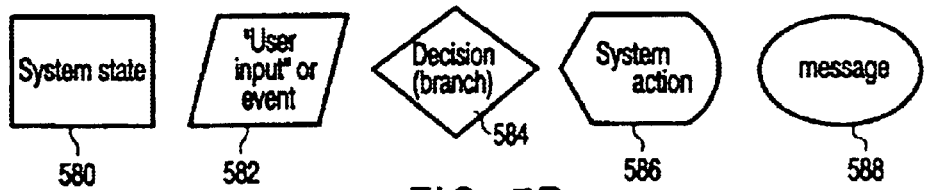

FIG. 5A shows a state diagram with the speech recognition subsystem at the top, with the user inputs recognized and the states taken according to them. This subsystem sends messages to the interaction engine. The reactions of the interactive engine to the messages are shown in the bottom half of the diagram. FIG. 5A shows the overall activation of the voice control. In general, it would be desirable that the voice control system was active all the time, listening for commands. However, typical words used for commands like "start", "stop", etc., occur too frequent in everyday language. It is difficult for the system to distinguish between such an incidental use of a command word and a real command. It is, therefore, preferred that a voice control command is preceded by a triggering command, like a system name. If this name is not too short to be confused with other similar words and not too common in everyday language, then it can be achieved that the speech recognition securely triggers at the appropriate time. This latter approach can be refined by keeping the speech recognition active for a certain timeout period after a command, waiting for further commands, or by keeping it active until an explicit "goodbye" command is spoken by the user. This means that the system name only needs to be said once when entering a whole series of commands. Advantageously, both ways of ending voice control activity are combined. The recognition becomes inactive when either a timeout period passes, or when an explicit command is given to end it. This is shown in FIG. 5A. From an initial IDLE state 510, the system transits to the LISTENING state 530 in response to having detected an activation/selection command (for example, the system name) in step 520. This is also signaled to the interaction engine 150 which chooses, in step 525, the "LISTENING" appearance, and displays (or plays) the "LISTENING" appearance to the user in step 527. In response to the transition to the LISTENING state 530, a time-span timer is also started. Upon expiration of this time span as detected in step 540, the system transits back to the IDLE state 510. The same transition occurs if the system recognizes an explicit command to become inactive, as shown in step 560. The transition to the IDLE state is also signaled to the interaction engine 150 which chooses, in step 575, the "IDLE" appearance, and displays (or plays) the "IDLE" appearance to the user in step 578. FIG. 5B illustrates the symbols used in FIG. 5A. Symbol 580 shows a system state. Symbol 582 shows an event, like a state change, a variable change, or user input. Symbol 584 shows a decision branch. Symbol 586 shows a system action. Symbol 588 shows a message to the interaction engine 150.

Figure 6:
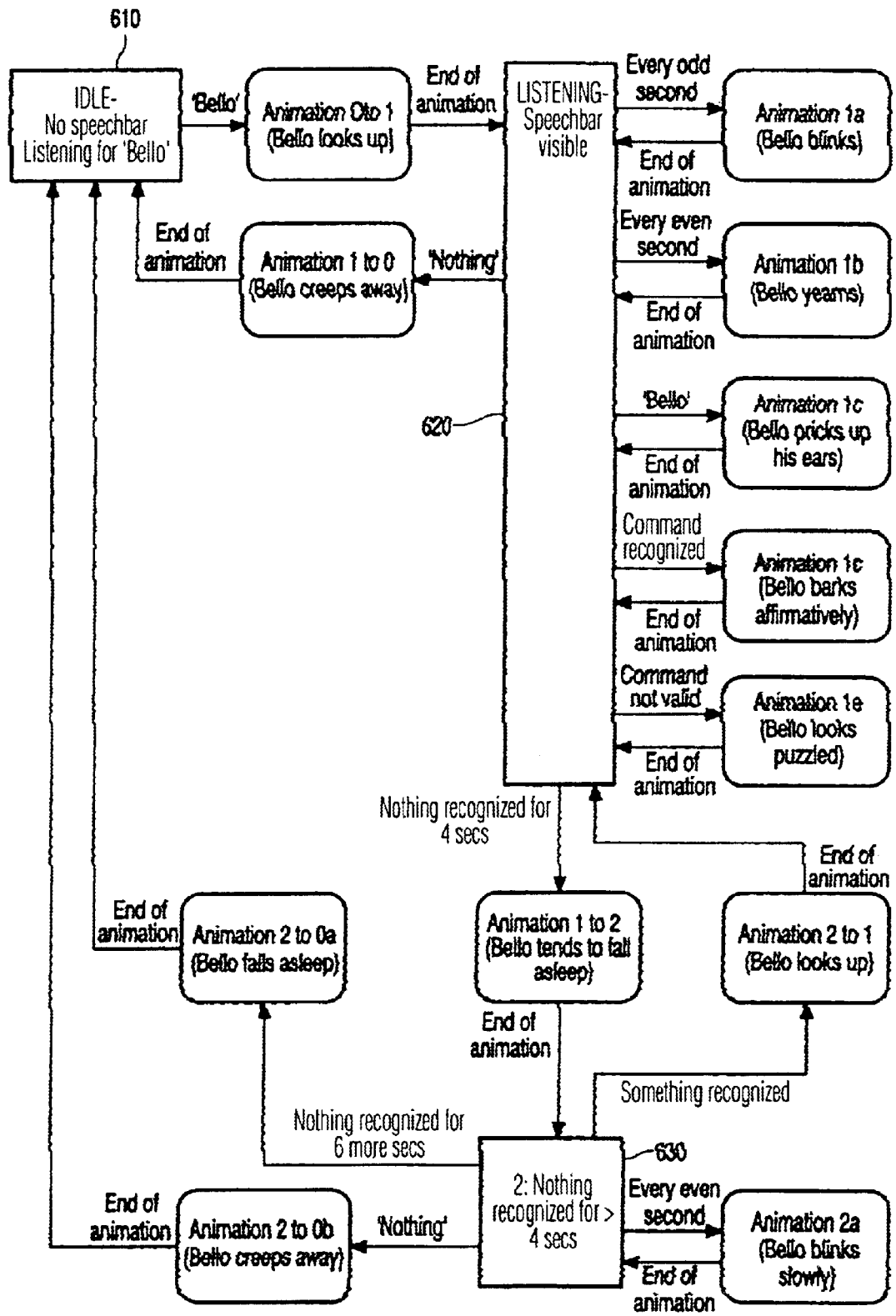
FIG. 6 shows a state diagram showing the display of animation in response to system events.

FIG. 6 shows a system wherein a single event results in an animation being triggered. In the example shown, there is a one-to-one relationship between the event and the animation. In the example, a total of 12 animations (bitmap sequences with separate sound files) are used. Filenames are consistent with system state diagram numbering. The system has three main states IDLE—no speechbar (610), LISTENING—speechbar (620), and GOING INACTIVE (630) if nothing has been recognized for more than four seconds. For the various events which can occur, it is indicated which animation is started. In the simple system as shown in FIG. 6, the animation is still determined by only one system element. According to the invention, the appearance, such as the animation, is determined by more than one system element. In such a system, it becomes possible to delete state 630, and integrate the 'falling asleep' behavior of this state in the various appearances shown for the LISTENING—speechbar 620 state.

What is claimed is:

1. A method of enabling a user to interact with a consumer electronics system, the behavior of the system being modeled by a plurality of dynamically changing system elements including system states denoting, at least, recognition of commands of the user, comprehension of commands of the user, non-comprehension of commands of the user, non-recognition of commands of the user, incremental passage of time, and inaction, the method comprising the steps:

choosing one appearance from a plurality of different appearances of one object in dependence on actual values of the plurality of dynamically change system elements; and presenting the chosen appearance to the user, wherein a plurality of the independent system elements exclusively correspond to a respective plurality of aspects of the object, the step of choosing an appearance comprises choosing, in response to a predetermined change of any one of said plurality of independent system elements, an appearance of the object that only differs in the respective one of the plurality of aspects from a currently chosen appearance of the object.

2. The method as claimed in claim 1, wherein one of the respective plurality of aspects of the object comprises a visual characteristic, including size, shape, brightness, color, opacity, and expression, of a visual sub-element of the object.

3. The method as claimed in claim 1, wherein one of the respective plurality of aspects of the object is an audible characteristic, including volume and prosody, of an auditive element of the object.

4. The method as claimed in claim 1, wherein the method includes animating the chosen appearance of the object.

5. The method as claimed in claim 4, wherein at least one system element is a dynamically changing variable element, the method including synchronizing the animation to the changing of the variable element.

6. The method as claimed in claim 1, wherein the system includes a speech recognizer, and at least one of the system states is a state of the recognizer.

7. The method as claimed in claim 4, wherein the system includes a voice control unit, and at least one of the system states is a state of the voice control unit.

8. A consumer electronics system in which a behavior of the system is modeled by a plurality of dynamically changing system elements including system states denoting, at least, recognition of commands of the user, comprehension of commands of the user, non-comprehension of commands of the user, non-recognition of commands of the user, incremental passage of time, and inaction, the system comprising:

means for choosing one appearance from a plurality of different appearances of one object in dependence on actual values of the plurality of dynamically change system elements; and means for conveying the plurality of system elements to the user by presenting the chosen appearance to the user, wherein a plurality of the independent system elements exclusively correspond to a respective plurality of aspects of the object, and the means for choosing one appearance comprises choosing, in response to a predetermined change of any one of said plurality of independent system elements, an appearance of the object that only differs in the respective one of the plurality of aspects from a currently chosen appearance of the object.

9. The consumer electronics system as claimed in claim 8, wherein the system includes a storage for storing a set of different appearances of the object, and wherein the means for choosing the appearance comprises means for selecting one of the appearances in the set, and means for retrieving the selected appearance from the storage.

10. A consumer electronics system as claimed in claim 8, wherein the system includes a storage for storing a basic appearance of the object, and wherein the means for choosing the appearance includes means retrieving the basic appearance of the object from the storage; and means for modifying the basic appearance to conform to a desired appearance.

* * * * *